May 7, 1957 R. HABIB 2,791,068
AUTOMATIC MACHINE TOOL
Filed Sept. 1, 1954 6 Sheets-Sheet 3

INVENTOR
ROBERT HABIB
BY
Wenderoth, Lind & Ponack
Attys

May 7, 1957  R. HABIB  2,791,068
AUTOMATIC MACHINE TOOL
Filed Sept. 1, 1954  6 Sheets-Sheet 4

INVENTOR
ROBERT HABIB

BY Wenderoth, Lind & Ponack
Attys

INVENTOR
ROBERT HABIB
BY
Wenderoth, Lind & Ponack
Attys

United States Patent Office
2,791,068
Patented May 7, 1957

2,791,068

AUTOMATIC MACHINE TOOL

Robert Habib, Geneva, Switzerland

Application September 1, 1954, Serial No. 453,609

Claims priority, application Switzerland
September 3, 1953

9 Claims. (Cl. 51—95)

The present invention relates to an automatic machine-tool, mainly for sharpening cutting tools provided with helical edges and for grinding threaded shafts, wherein the support of the work-piece is driven in a reciprocating movement combined at one part of its stroke, with a reciprocating oscillating movement, in such a manner as to permit of a helical action of the tool of said machine-tool upon the work-piece.

This machine is characterized by a free wheel coupling device which operates at the other part of the reciprocating stroke of the said support and is intended to drive the said support in intermittent rotation in one single direction, in such a manner that each reciprocating movement begins from a different angular position of the work-piece.

The accompanying drawings show by way of example one form of embodiment of the invention.

Figure 1:
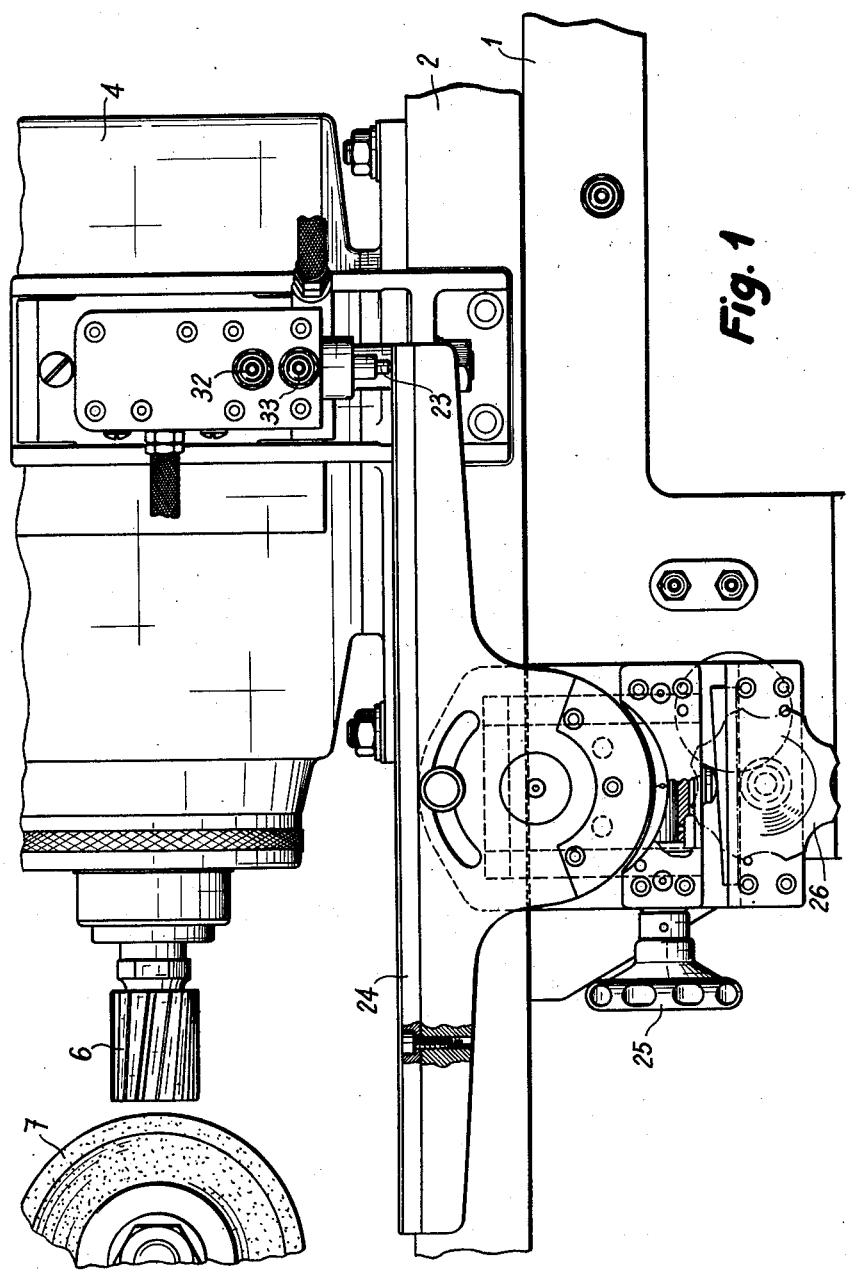
Figure 1 is an elevation of part of the machine comprising the spindle head-stock.

The machine illustrated comprises a fixed frame 1 on which is mounted a table 2 rolling on ball bearings 3 (Figure 4) and moving in the plane of Figure 1. The table 2 carries a spindle head-stock 4 wherein rotates the spindle 5 carrying the piece which is to be sharpened, represented here by a milling cutter 6. The grinding wheel is designated as 7 (Figure 1). The head-stock 4 is adjustable and can be displaced on the table 2. The axis of the spindle can, for example, be arranged so as to be parallel to that of the grinding wheel.

Figure 2:
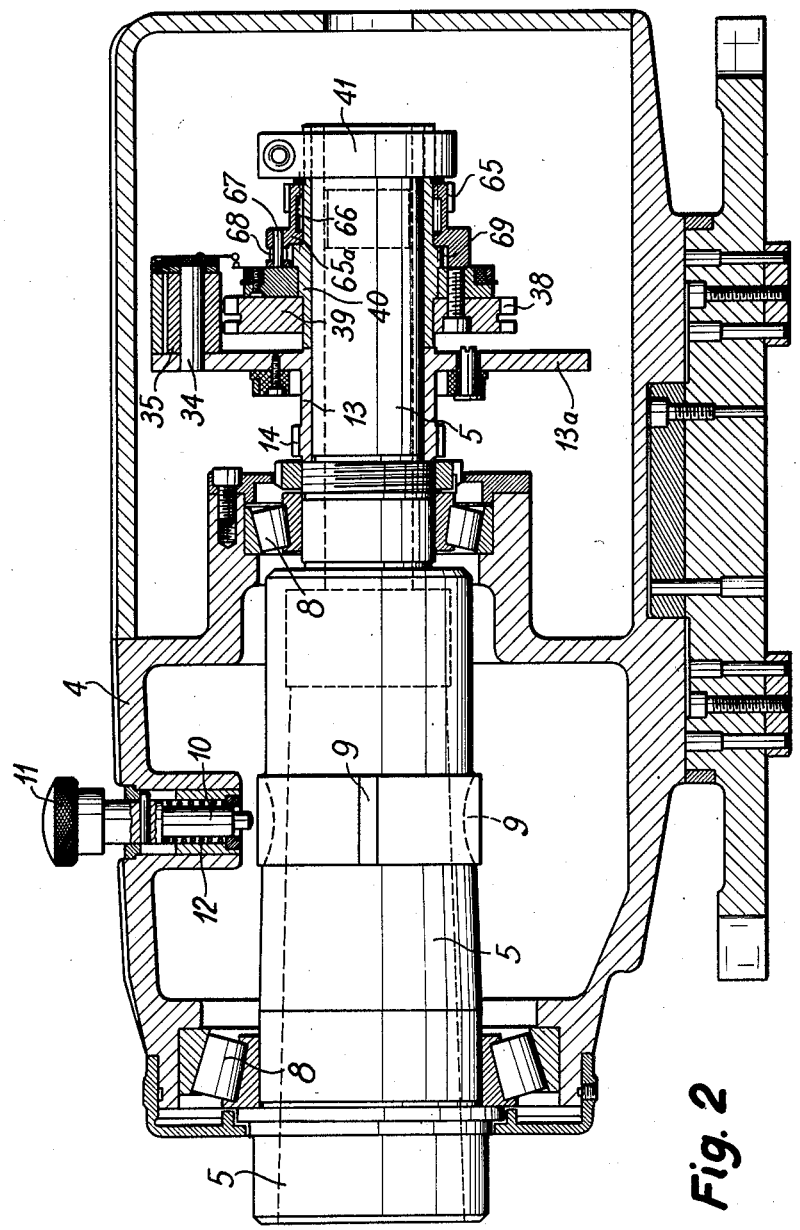
Figure 2 is a sectional view on a larger scale of a detail of the machine, taken on the line II—II of Figure 3.

The spindle 5 is rotatably mounted in the head-stock 4 by means of two roller bearings 8. It is formed with slots 9 which co-operate with a bolt 10 controlled by a knob 11 by means of which it can be locked when the tool to be sharpened is being removed or fixed. This bolt is returned by a coil spring 12 which holds it in its rest position shown in Figure 2. Mounted freely on the spindle 5 is a sleeve 13 with teeth 14, fast with a bearing plate 13a (Figure 2). The teeth 14 mesh with a driving wheel 15 (Figure 3) whose shaft 16 is fast with a gear wheel 17 driven by a toothed rack 18. The latter is fixed to the end of the rod 19 of a piston 20 sliding in a fixed cylinder 21 under the action of a hydraulic apparatus which will be described hereinafter.

Figure 4:
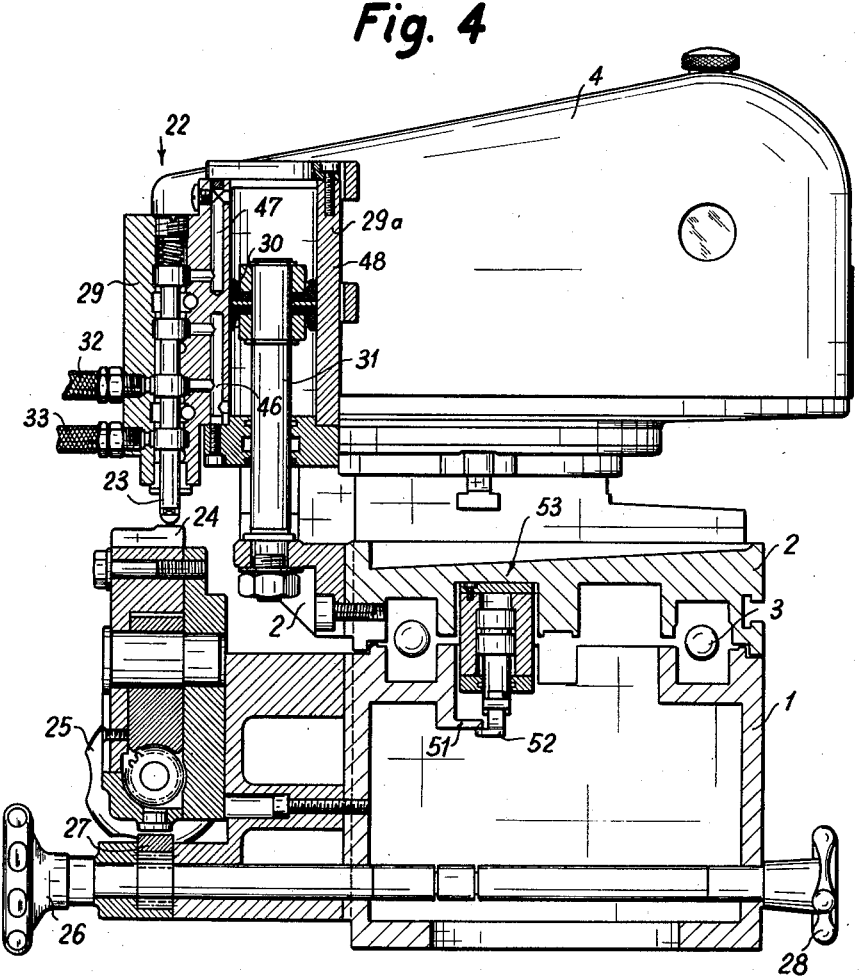
Figure 4 is a side view of the part of the machine shown in Figure 1.

The table 2 carries a distributor 22 which moves with the said table and which is provided with a feeler 23 bearing against an inclined guide-bar 24 fixed to the frame 1 of the machine (Figures 1 and 4). The inclination of the said guide-bar is adjustable, and it is locked in the desired position by means of a screw 25; its height can also be adjusted by a handle 26 controlling a regulating cam 27 which can be locked by means of a screw 28. The body 29 of the distributor is fast with a pilot cylinder 29a moving about a fixed piston 30 fast with a rod 31 fixed to the table 2. Owing to this arrangement the movements of the feeler 23 produce a limited action, the cylinder 29a acting as a balancing means. The details of the hydraulic apparatus will be described hereinafter.

During the reciprocating movement of the table 2, the feeler 23 follows the guide-bar 24 and the distributor 22 delivers oil under pressure into the cylinder 21 through the conduits 32 and 33, thus causing movements of the piston 20 which are transmitted to the sleeve 13 through the intermediary of the connection hereinbefore described. The said sleeve 13 is thus driven in oscillating reciprocation during the reciprocation of the head-stock.

Figure 5:
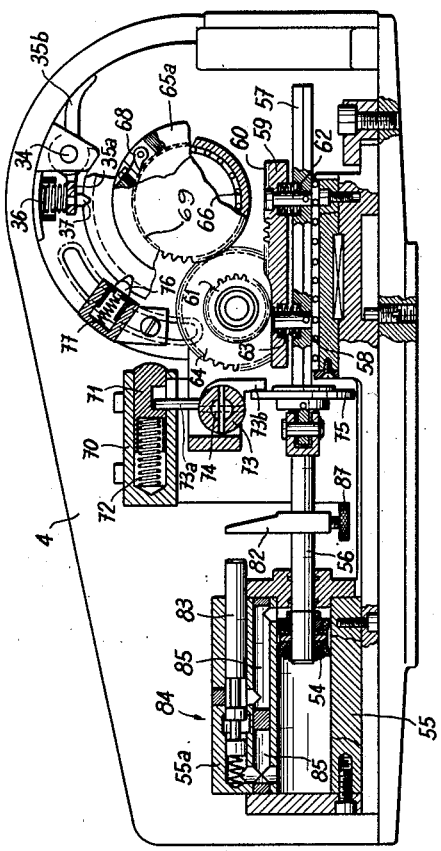
Figure 5 is a sectional view taken on the line V—V of Figure 3.

Carried on the bearing plate 13a and articulated on a pin 34 is a two-armed lever 35 (Figures 2 and 5) whereof one arm 35a, which is under the action of a return spring 36, carries a bolt 37 adapted to penetrate into one of a series of radial notches 38 formed in a disc 39 forced on to a sleeve 40 which is itself rendered fast with the spindle 5 by a clamping collar 41. When the bolt 31 has engaged in one of the notches 38 the oscillating movements of the sleeve 13 are transmitted to the spindle 5.

Figure 6:
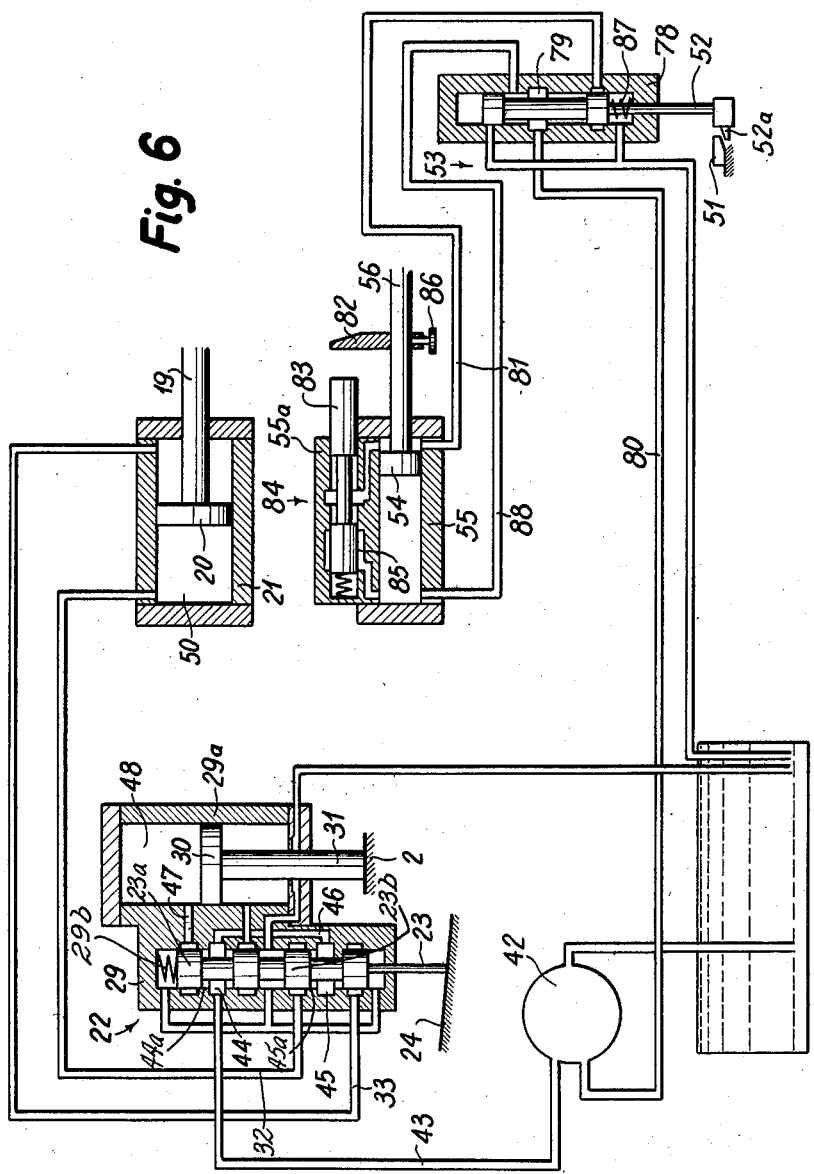
Figure 6 is a diagram of the hydraulic apparatus of the machine.

The part of the machine which has just been described operates in the following manner: When the head-stock moves towards the left of Figure 1, the milling cutter 6 approaches the grinding wheel 7. If the guide-bar 24 occupies, for example, the position shown in Figure 1, the feeler 23 is moved towards the top of the said drawing during the right-to-left movement of the head-stock. The oil under pressure is driven by a pump 42 (Figure 6) through a conduit 43 into a chamber 44 of the distributor 22. This chamber 44 communicates with a chamber 45 by a conduit 46. Since the feeler 23 is moved upwards against spring 29b, the pistons 23a and 23b are displaced from cylinder bores 44a and 45a which enables chambers 44 and 45 to communicate simultaneously with conduits 47 and 32 respectively. The oil under pressure coming from the chamber 44 may then flow through conduit 47 into the upper chamber 48 of the pilot cylinder 29a situated above the fixed piston 30, urging the cylinder 29a upwards and simultaneously the oil coming from the chamber 45 may flow through the conduit 32 into the left-hand part 50 of the cylinder 21, urging the piston 20 towards the right of Fig. 6. The pistons 23a and 23b being of identical shape and dimension, the oil outputs through conduits 47 and 32 are strictly equal. The cylinder bores 29a and 21 being also identical, the strokes of piston 20 and cylinder 29a are perfectly synchronised. The latter being displaced upwards as does the feeler 23, the pistons 23a and 23b are taking, with regard to the cylinder 29a well defined position of balance, which depends on the translation speed of the feeler 23, of the oil pressure and of the strength of the spring 29b.

In said balanced position, the pistons 23a and 23b are situated at a distance above the cylinder bores 44a and 45a so that the oil may flow continuously with a steady output, during the translation movement of the feeler 23, from chambers 44 and 45 into chambers 48 and 50 respectively.

When the translation movement of the feeler 23 is stopped, the spring 29b urges the cylinder 29 upwards so that the pistons 23a and 23b are returned into contact with the cylinder bores 44a and 45a respectively and are interrupting the flow of oil into conduits 47 and 32. This interruption causes simultaneously the movements of cylinder 29 and piston to stop in a determined position.

In other words, the movement of the body 29 of the distributor 22 is neutralising the upward movement of the feeler 23, the cylinder 29a thus constituting a balancing means limiting the action of the movements of the feeler 23.

Figure 3:
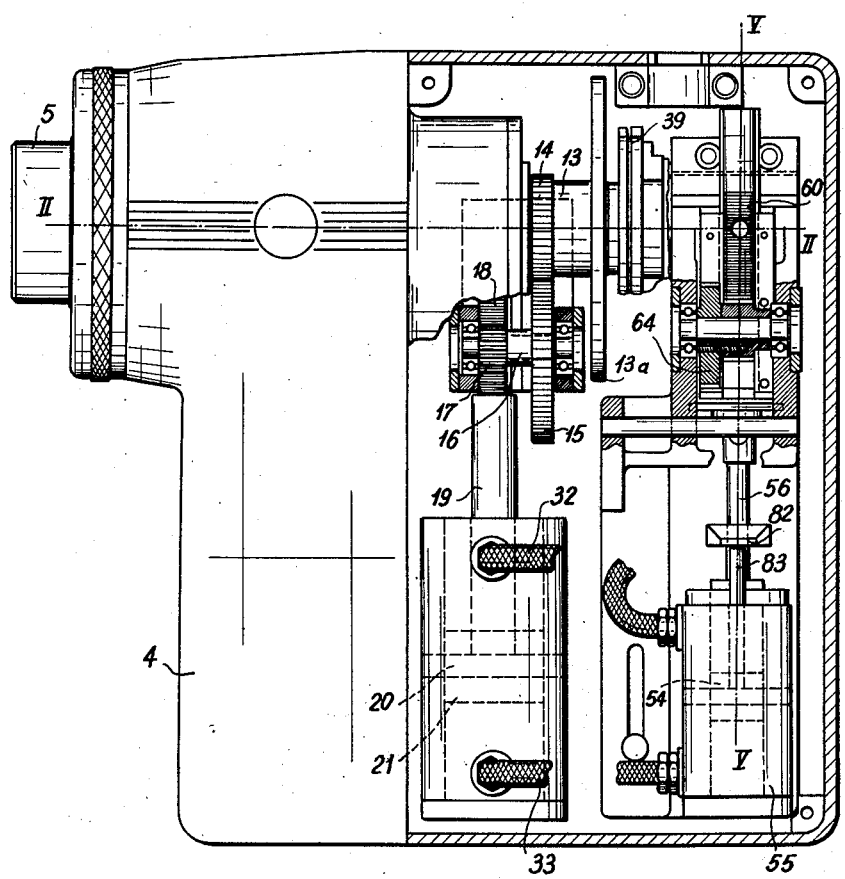
Figure 3 is a plan view of the spindle head-stock.

The movement of the piston 20 displaces the toothed rack 18 upwards towards the top of Fig. 3, entraining the gear wheel 17 and the wheel 15, which carries along the toothed wheel 14 of the sleeve 13. The latter carries out an angular movement which is transmitted by way of the bolt 37 to the disc 39 fast with the spindle 5; the milling cutter thus carries out a rotational movement combined with its reciprocating movement whilst it is in contact with the grinding wheel 7, and the sharpening is thus effected helically. When the head-stock 4 returns, the feeler 23 moves towards the bottom of Figure 4, causing in the same manner as when it moves toward the top of Fig. 3 the toothed rack 18 to move downwards towards the bottom of Figure 3, and the milling cutter 6 then turns in the opposite direction to the direction in which it was previously turning.

The machine illustrated furthermore comprises an abutment 51 (Figure 4) mounted adjustably on the frame 1 of the machine and with which there cooperates the feeler 52 of a distributor 53 situated under the table. This distributor controls, by way of a hydraulic apparatus which will be described hereinafter, a piston 54 (Figures 3 and 5) moving in a cylinder 55 carried by the head-stock. The rod 56 of the piston 54 is connected to a slide 57 rolling on rollers 58. The said slide carries a shoe 59 provided over part of the length thereof with gullet teeth 60 co-operating with a ratchet wheel 61. The shoe 59 is mounted on pins 62 carried by the slide 57 and is urged against the ratchet wheel 61 by coil springs 63. The ratchet wheel 61 is fast with a wheel 64 meshing with a toothed wheel 65 which is rotatably mounted by means of rollers 66 (Figure 2) on the sleeve 40 fast with the spindle 5. The toothed wheel 65 is integral with a bell-shaped member 65a carrying a pawl 68, articulated at 67, co-operating with gullet teeth 69 of the sleeve 40. Also carried by the head-stock 4, and sliding in a cylindrical guide 70, is a push member 71 which is subjected to the action of a coil spring 72 and is held in the position shown in Figure 5 by an arm 73a of a two-armed lever 73; this lever is hinged at 74 to the head-stock, and its second arm 73b co-operates with a buffer 75 fast with the slide 57. When under the action of the abutment 51 controlling the feeler 52, the piston 54 and therefore the slide 57 are moved in the direction towards the left of Figure 5, the buffer 75 leaves the arm 73b of the lever 73, thus freeing the push-member 71. This moment corresponds to a position of the table wherein the work to be ground is no longer in contact with the grinding wheel; the feeler 23 of the distributor 22 has then left the guide-bar 24, which brings the sleeve 13 into an angular position, not shown, wherein the end of the arm 35b of the lever 35 is situated opposite the push member 71. Once the push member 71 has been liberated it comes into contact with the arm 35b and moves the latter in opposition to the action of the return spring 35, thus disengaging the bolt 37 from the slot 38. The disc 39 is thus freed from the bearing plate 13a and therefore from the whole control apparatus producing the oscillating reciprocation of the spindle 5. The only remaining connection between the plate 13a and the disc 39 is constituted by a catch 76 (Figure 5) which is under the influence of a return spring 77 carried by the plate 13a and penetrating into the slots 38. The action of this catch 76 does not prevent the disc 39 from turning relatively to the bearing plate 13a when the disc is urged strongly. When the shoe 59 moves in the direction towards the left of Figure 5, the teeth 60 of the said shoe contact the ratchet wheel 61 and cause the latter to turn in clockwise direction. The teeth 60 are constructed as gullet teeth so that upon engagement with the ratchet no angular displacement of the latter is caused by lack of coincidence in the teeth, which could happen if the teeth 60 were teeth of an ordinary rack and the ratchet an ordinary toothed wheel. The wheel 65 is driven in the counter-clockwise direction and the pawl 68 entrains the sleeve 40. Upon the return of the shoe 59 under the action of the hydraulic apparatus which will be described hereinafter the wheel 65 turns in the clockwise direction without entraining the sleeve 40. When the ratchet wheel 65 is driven anticlockwise, the spindle 5 also turns by an amount proportional to the linear displacement of the slide 57, said displacement being adjustable as will be described hereinafter. This angular displacement of the spindle 5 is such that the catch 76 penetrates into another slot 38, the following blade of the milling cutter 6 being then in the sharpening position. The operation described hereinbefore can then be repeated.

The hydraulic apparatus controlling the piston 54 is the following:

The distributor 53 (Figure 6) comprises a body 78 wherein is formed a chamber 79 which is supplied with oil under pressure by the pump 42 through a conduit 80. When the feeler 52 is displaced downwards by the abutment 51, the oil under pressure is forced through a conduit 81 into the right-hand part (Figure 6) of the cylinder 55, which causes the displacement of the piston 54 and consequently the slide 57 towards the left of Figures 5 and 6. During this displacement an abutment 82 carried by the rod 56 of the piston 54 abuts on a push member 83 of an auxiliary distributor 84, which opens a conduit 85 formed within the body 55a of the said auxiliary distributor, thus connecting the two chambers of the cylinder 55 whose pressure is equilibrated, thus stopping the piston 54. The stroke of this piston and consequently the amplitude of the angular displacement of the spindle is dependent on the position of the abutment 82 along the rod 56. The said abutment is adjustable and can be locked by means of a screw 86. Once the piston 54 is stopped the table continues its translational movement until the moment when the head 52a of the feeler 52 leaves the abutment 51. The feeler 52 is then returned by a spring 87 and returns to the position shown in Figure 6 in which the oil under pressure is delivered through a conduit 88 into the left-hand part of the cylinder 55, urging the piston 54 to the right so as to bring it into the rest position; this stroke has no effect on the spindle since as has already been seen hereinbefore, the pawl 68 then jumps over the teeth 69 of the sleeve 40.

What I claim:

1. In an automatic machine-tool, the combination of a frame, a table slidably mounted on the frame, a headstock rigid with the table, a work-carrying spindle revolubly carried by said headstock, a grinding wheel, means carrying said grinding wheel in a location for which said grinding wheel is adapted to operatively engage the work on the spindle, a sleeve freely mounted on the spindle, a hydraulic mechanism driving the said sleeve into rotation, a sloping guide-bar fixed to the frame in a vertical plane parallel with the direction of the sliding movement of the table on said frame, a feeler engaging said guide-bar, a vertical cylinder and piston arrangement, the piston of which is rigid with the table, a distributor including two parts shiftable with reference to each other and of which one is rigid with the feeler, the other part being rigid with the cylinder, means wherethrough the distributor controls the hydraulic mechanism to provide for an oscillatory reciprocating rotation of the sleeve during each operative reciprocation of the table corresponding to the shifting of the feeler over the guide-bar, a disc coaxially rigid with the spindle and provided with a plurality of peripheral spaced notches, a catch pivotally secured to the sleeve, a spring urging said catch into selective engagement with one of last mentioned notches to provide operative connection between the sleeve and the spindle and means wherethrough the distributor feeds a hydraulic medium into the cylinder to either side of the piston according to the direction of the movement of the feeler over the guide-bar to shift the cylinder and the distributor part rigid therewith with reference to the feeler and feeler carrying part and to restore thereby the original relative position between the two parts of the distributor.

2. In an automatic machine-tool, the combination of a frame, a table slidably mounted on a frame, a headstock rigid with the table, a work-carrying spindle revolubly carried by said headstock, a grinding wheel, means carrying said spindle wheel in a location for which said grinding wheel is adapted to operatively engage the work on the spindle, a sleeve freely mounted on the spindle, a hydraulic mechanism driving the said sleeve into rotation, a sloping guide-bar fixed to the frame in a vertical plane parallel with the direction of the sliding movement of the table on said frame, a feeler engaging said guide-bar, a distributor including two parts shiftable with reference to each other and of which one is rigid with the feeler, means wherethrough the distributor controls the hydraulic mechanism to provide for an oscillatory reciprocating rotation of the sleeve during each operative reciprocation of the table corresponding to the shifting of the feeler over the guide-bar, a disc coaxially rigid with the spindle and provided with a plurality of peripheral spaced notches, a catch pivotally secured to the sleeve, a spring urging said catch into selective engagement with one of last mentioned notches to provide operative connection between the sleeve and the spindle, a further hydraulic mechanism, a unidirectional frictional clutch operatively connecting the latter with the spindle, a second distributor controlled by the relative further movement of the table with reference to the frame away from the grinding wheel and beyond the stroke corresponding to engagement between the feeler and the guide-bar and controlling the further hydraulic mechanism, a push member adapted to assume an outer operative and an inner inoperative position and to release the catch engaging a notch in the spindle disc when the catch and sleeve have entered their terminal angular position at the end of the operative stroke of the table, a spring urging the push member into its outer position, a lever adapted to hold the push member in its inner position, means whereby the further hydraulic mechanism controls the said lever to release said push member and thereby the catch upon engagement of the distributor during the above mentioned further movement of the table, the hydraulic mechanism operatively driving the spindle through the clutch after said release to make a further notch in the spindle disc register with the cooperating catch and the return movement of the table corresponding to said further relative movement returning the lever into engagement with the push member to release the catch and to provide for engagement of said catch with the notch registering therewith.

3. In an automatic machine-tool, the combination of a frame, a table slidably mounted on the frame, a headstock rigid with the table, a work-carrying spindle revolubly carried by said headstock, a grinding wheel, means carrying said grinding wheel in a location for which said grinding wheel is adapted to operatively engage the work on the spindle, a sleeve freely mounted on the spindle, a hydraulic mechanism driving the said sleeve into rotation, a sloping guide-bar fixed to the frame in a vertical plane parallel with the direction of the sliding movement of the table on said frame, a feeler engaging said guide-bar, a distributor including two parts shiftable with reference to each other and of which one is rigid with the feeler, means wherethrough the distributor controls the hydraulic mechanism to provide for an oscillatory reciprocating rotation of the sleeve during each operative reciprocation of the table corresponding to the shifting of the feeler over the guide-bar, a disc coaxially rigid with the spindle and provided with a plurality of peripheral spaced notches, a catch pivotally secured to the sleeve, a spring urging said catch into selective engagement with one of last mentioned notches to provide operative connection between the sleeve and the spindle, a further hydraulic mechanism, a slider controlled thereby, a rack yieldingly carried by said slider to slide in parallelism therewith, a gearing including a pinion controlled by said rack and ratchet system operatively controlling the spindle in one direction, a second distributor controlled by the relative further movement of the table with reference to the frame, away from the grinding wheel and beyond the stroke corresponding to engagement between the feeler and the guide-bar and controlling the further hydraulic mechanism, a push member adapted to assume an outer operative and an inner inoperative position and to release the catch engaging a notch in the spindle disc when the catch and sleeve have entered their terminal angular position at the end of the operative stroke of the table, a spring urging the push member into its outer position, a lever adapted to hold the push member in its inner position, a member rigid with the slider and adapted to control the said lever to release said push member and thereby the catch upon engagement of the distributor during the above mentioned further movement of the table, the hydraulic mechanism operatively driving the spindle through the clutch after said release to make a further notch in the spindle disc register with the cooperating catch and the return movement of the table corresponding to said further relative movement returning the lever into engagement with the push member to release the catch and to provide for engagement of said catch with the notch registering therewith.

4. In an automatic machine-tool, the combination of a frame, a table slidably mounted on the frame, a headstock rigid with the table, a work-carrying spindle revolubly carried by said headstock, a grinding wheel, means carrying said grinding wheel in a location for which said grinding wheel is adapted to operatively engage the work on the spindle, a sleeve freely mounted on the spindle, a hydraulic mechanism driving the said sleeve into rotation, a sloping guide-bar fixed to the frame in a vertical plane parallel with the direction of the sliding movement of the table on said frame, a feeler engaging said guide-bar, a distributor including two parts shiftable with reference to each other and of which one is rigid with the feeler, means wherethrough the distributor controls the hydraulic mechanism to provide for an oscillatory reciprocating rotation of the sleeve during each operative reciprocation of the table corresponding to the shifting of the feeler over the guide-bar, a disc of peripheral spaced notches, a catch pivotally secured to the sleeve, a spring urging said catch into selective engagement with one of last mentioned notches to provide operative connection between the sleeve and the spindle, a further hydraulic mechanism, a slider controlled thereby, a rack provided with gullet teeth and yieldingly carried by said slider to slide in parallelism therewith, a gearing including a pinion controlled by said rack and ratchet system operatively controlling the spindle in one direction, a second distributor controlled by the relative further movement of the table with reference to the frame, away from the grinding wheel and beyond the stroke corresponding to engagement between the feeler and the guide-bar and controlling the further hydraulic mechanism, a push member adapted to assume an outer operative and an inner inoperative position and to release the catch engaging a notch in the spindle disc when the catch and sleeve have entered their terminal angular position at the end of the operative stroke of the table, a spring urging the push member into its outer position, a lever adapted to hold the push member in its inner position, a member rigid with the slider and adapted to control the said lever to release said push member and thereby the catch upon engagement of the distributor during the above mentioned further movement of the table, the hydraulic mechanism operatively driving the spindle through the clutch after said release to make a further notch in the spindle disc register with the cooperating catch, a stop frictionally holding the spindle disc in the angular position occupied thereby and the return movement of the table corresponding to said further relative movement returning the lever into engagement with the push member to release the catch and to provide for engagement of said catch with the notch registering therewith.

5. In an automatic machine-tool, the combination of a frame, a table slidably mounted on the frame, a headstock rigid with the table, work-carrying spindle carried by said headstock, a grinding wheel, means carrying said grinding wheel in a location for which said grinding wheel is adapted to operatively engage the work on the spindle, a sleeve freely mounted on the spindle, a hydraulic mechanism driving the said sleeve into rotation, a sloping guide-bar, fixed to the frame in a vertical plane parallel with the direction of the sliding movement of the table on said frame, a feeler engaging said guide-bar, a distributor including two parts shiftable with reference to each other and of which one is rigid with the feeler, means wherethrough the distributor controls the hydraulic mechanism to provide for an oscillatory reciprocating rotation of the sleeve during each operative reciprocation of the table corresponding to the shifting of the feeler over the guide-bar, a disc coaxially rigid with the spindle and provided with a plurality of peripheral spaced notches, a catch pivotally secured to the sleeve, a spring urging said catch into selective engagement with one of last mentioned notches to provide operative connection between the sleeve and the spindle, a further hydraulic mechanism, a slider controlled thereby, a rack yieldingly carried by said slider to slide in parallelism therewith, a gearing including a pinion controlled by said rack and ratchet system operatively controlling the spindle in one direction, a second distributor controlled by the relative further movement of the table with reference to the frame, away from the grinding wheel and beyond the stroke corresponding to engagement between the feeler and the guide-bar and controlling the further hydraulic mechanism, a push member adapted to assume an outer operative and an inner inoperative position and to release the catch engaging a notch in the spindle disc when the catch and sleeve have entered their terminal angular position at the end of the operative stroke of the table, a spring urging the push member into its outer position, a lever adapted to hold the push member in its inner position, a member rigid with the slider and adapted to control the said lever to release said push member and thereby the catch upon engagement of the distributor during the above mentioned further movement of the table, the hydraulic mechanism operatively driving the spindle through the clutch after said release to make a further notch in the spindle disc register with the cooperating catch, an auxiliary distributor adapted to stop operation of the second distributor, a stop adjustably mounted on the slider and adapted to start the auxiliary distributor at a predetermined point of the travel of the slider to thereby stop operation of the second distributor and of the further hydraulic mechanism controlled by the latter, and the return movement of the table corresponding to said further relative movement returning the lever into engagement with the push member to release the catch and to provide for engagement of said catch with the notch registering therewith.

6. In an automatic machine-tool, the combination of a frame, a table slidably mounted on the frame, a headstock rigid with the table, a work-carrying spindle revolubly carried by said headstock, a grinding wheel, means carrying said grinding wheel in a location for which said grinding wheel is adapted to operatively engage the work on the spindle, a sleeve freely mounted on the spindle, a hydraulic mechanism driving the said sleeve into rotation, a sloping guide-bar fixed to the frame in a vertical plane parallel with the direction of the sliding movement of the table on said frame, a feeler engaging said guide-bar, a distributor including two parts shiftable with reference to each other and of which one is rigid with the feeler, means wherethrough the distributor controls the hydraulic mechanism to provide for an oscillatory reciprocating rotation of the sleeve during each operative reciprocation of the table corresponding to the shifting of the feeler over the guide-bar, a disc coaxially rigid with the spindle and provided with a plurality of peripheral spaced notches, a catch pivotally secured to the sleeve, a spring urging said catch into selective engagement with one of the last mentioned notches to provide operative connection between the sleeve and the spindle.

7. In an automatic machine-tool, the combination of a frame, a table slidably mounted on the frame, means controlling the reciprocation of the table over the frame, a headstock rigid with the table, a work-carrying spindle revolubly carried by said headstock, a grinding wheel, means carrying said grinding wheel in a location for which said grinding wheel is adapted to operatively engage the work on the spindle, a sleeve freely mounted on the spindle, a hydraulic mechanism adapted to drive the said sleeve into rotation, a sloping guide-bar fixed to the frame in a vertical plane parallel with the direction of the sliding movement of the table on said frame, a feeler engaging said guide-bar, means for adjusting the angular setting of the guide-bar in its vertical plane, a distributor including two parts shiftable with reference to each other and of which one is rigid with the feeler, the other part being rigid with the table, means wherethrough the distributor controls the hydraulic mechanism to provide for an oscillatory reciprocating rotation of the sleeve during each operative reciprocation of the table and corresponding to the shifting of the feeler over the guide-bar, a disc coaxially rigid with the spindle and provided with a plurality of peripheral spaced notches, a catch pivotally secured to the sleeve, a spring urging said catch into operative engagement with said last-mentioned notches to provide operative connection between the sleeve and the spindle.

8. In an automatic machine-tool, the combination of a frame, a table slidably mounted on the frame, means controlling the reciprocation of the table over the frame, a headstock rigid with the table, a work-carrying spindle revolubly carried by said headstock, a grinding wheel, means carrying said grinding wheel in a location for which said grinding wheel is adapted to operatively engage the work on the spindle, a sleeve freely mounted on the spindle, a hydraulic mechanism adapted to drive the said sleeve into rotation, a sloping guide-bar fixed to the frame in a vertical plane parallel with the direction of the sliding movement of the table on said frame, a feeler engaging said guide-bar, means for adjusting the angular setting of the guide-bar in its vertical plane, a distributor including two parts shiftable with reference to each other and of which one is rigid with the feeler, the other part being rigid with the table, means wherethrough the distributor controls the hydraulic mechanism to provide for an oscillatory reciprocating rotation of the sleeve during each operative reciprocation of the table and corresponding to the shifting of the feeler over the guide-bar, a disc coaxially rigid with the spindle and provided with a plurality of peripheral spaced notches, a catch pivotally secured to the sleeve, a spring urging said catch into operative engagement with said last-mentioned notches to provide operative connection between the sleeve and the spindle, hydraulic means adapted to produce simultaneously the indexing of the spindle at the end of each reciprocation of the table and the disconnection of the catch with reference to the notched disc.

9. In an automatic machine-tool, the combination of a frame, a table slidably mounted on a frame, a headstock rigid with the table, a work-carrying spindle revolubly carried by said headstock, a grinding wheel, means carrying said grinding wheel in a location for which said grinding wheel is adapted to operatively engage the work on the spindle, a sleeve freely mounted on the spindle, a hydraulic mechanism adapted to drive the said sleeve into rotation, a sloping guide-bar fixed to the frame in a vertical plane parallel with the direction of the sliding movement of the table on said frame, a feeler engaging said guide-bar, a distributor including two parts shiftable with reference to each other and of which one is rigid with the feeler, the other part being rigid with the table, means wherethrough the distributor controls the hydraulic mechanism to provide for an oscillatory reciprocating rotation of the sleeve during each operative reciprocation of the table corresponding to the shifting of the feeler over the guide-bar, a disc coaxially rigid with the spindle and provided with a plurality of peripheral spaced notches, a catch pivotally secured to the sleeve, a spring urging said catch into engagement with one of said notches to provide operative connection between the sleeve and the spindle, a further hydraulic mechanism, a unidirectionally driving clutch operatively connecting the latter with the spindle, a second distributor controlled by the relative further movement of the table with reference to frame away from the grinding wheel and beyond the stroke corresponding to engagement between the feeler and the guide-bar and controlling the further hydraulic mechanism, means controlled by said further hydraulic mechanism and adapted to release the catch with reference to the notched disc as soon as the second distributor has been operated by said further movement of the table.

References Cited in the file of this patent

UNITED STATES PATENTS

| | | |
|---|---|---|
| 1,753,096 | Snarry | Apr. 1, 1930 |
| 1,870,764 | Aeppli | Aug. 9, 1932 |
| 1,899,654 | Ward | Feb. 28, 1933 |
| 1,976,818 | Ward | Oct. 16, 1934 |